(12) United States Patent
Maguin et al.

(10) Patent No.: US 9,121,318 B2
(45) Date of Patent: Sep. 1, 2015

(54) DELIVERY UNIT FOR DELIVERING A LIQUID ADDITIVE AND MOTOR VEHICLE HAVING A DELIVERY UNIT

(71) Applicant: EMITEC GESELLSCHAFT FUER EMISSIONSTECHNOLOGIE MBH, Lohmar (DE)

(72) Inventors: Georges Maguin, Marly (FR); Cheikh Diouf, Silly-sur-Nied (FR); Sven Schepers, Troisdorf (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/279,556

(22) Filed: May 16, 2014

(65) Prior Publication Data

US 2014/0245726 A1 Sep. 4, 2014

Related U.S. Application Data

(63) Continuation of application No. PCT/EP2012/071527, filed on Oct. 31, 2012.

(30) Foreign Application Priority Data

Nov. 16, 2011 (DE) .......................... 10 2011 118 652

(51) Int. Cl.
*F01N 3/04* (2006.01)
*F01N 3/08* (2006.01)
*F01N 3/20* (2006.01)

(52) U.S. Cl.
CPC ................ *F01N 3/08* (2013.01); *F01N 3/2066* (2013.01); *F01N 2610/1406* (2013.01); *F01N 2610/1433* (2013.01); *Y02T 10/24* (2013.01); *Y10T 137/85978* (2015.04)

(58) Field of Classification Search
CPC . F01N 3/2066; F01N 3/08; F01N 2610/1406; F01N 2610/1433
USPC ........................................ 60/310; 137/565.01
See application file for complete search history.

(56) References Cited

U.S. PATENT DOCUMENTS

| | | | | |
|---|---|---|---|---|
| 5,988,213 | A * | 11/1999 | Yoshioka | 137/590 |
| 6,283,731 | B1 * | 9/2001 | Yoshioka | 417/423.3 |
| 8,960,483 | B2 | 2/2015 | Haeberer et al. | |
| 2009/0230136 | A1 | 9/2009 | Dougnier et al. | |

(Continued)

FOREIGN PATENT DOCUMENTS

| | | |
|---|---|---|
| DE | 102008031052 A1 | 1/2009 |
| DE | 102009042510 A1 | 3/2011 |
| DE | 102010014314 A1 | 10/2011 |

(Continued)

*Primary Examiner* — Jason Shanske
(74) *Attorney, Agent, or Firm* — Laurence A. Greenberg; Werner H. Stemer; Ralph E. Locher

(57) ABSTRACT

A delivery unit for delivering a liquid additive from a tank into an exhaust gas treatment device includes at least a housing which can be mounted on the tank, and a component carrier which carries at least one pump and is fixed in the housing by a clamping plate. A motor vehicle having a delivery unit is also provided.

10 Claims, 4 Drawing Sheets

(56) References Cited

U.S. PATENT DOCUMENTS

| | | |
|---|---|---|
| 2012/0006832 A1 | 1/2012 | Krause et al. |
| 2012/0311999 A1 | 12/2012 | Hodgson et al. |
| 2012/0321525 A1 | 12/2012 | Maus et al. |
| 2013/0025269 A1 | 1/2013 | Hodgson et al. |

FOREIGN PATENT DOCUMENTS

| | | |
|---|---|---|
| JP | 2010523871 A | 7/2010 |
| WO | 2010078989 A1 | 7/2010 |
| WO | 2011085830 A1 | 7/2011 |
| WO | 2011086038 A1 | 7/2011 |

* cited by examiner

DELIVERY UNIT FOR DELIVERING A LIQUID ADDITIVE AND MOTOR VEHICLE HAVING A DELIVERY UNIT

CROSS-REFERENCE TO RELATED APPLICATION

This is a continuation, under 35 U.S.C. §120, of copending International Application No. PCT/EP2012/071527, filed Oct. 31, 2012, which designated the United States; this application also claims the priority, under 35 U.S.C. §119, of German Patent Application DE 10 2011 118 652.6, filed Nov. 16, 2011; the prior applications are herewith incorporated by reference in their entirety.

BACKGROUND OF THE INVENTION

Field of the Invention

The invention relates to a delivery unit for delivering a liquid additive from a tank into an exhaust gas treatment device. The invention also relates to a motor vehicle having a delivery unit.

Exhaust gas treatment devices into which an additive is fed are known especially for cleaning the exhaust gases from internal combustion engines in the motor vehicle sector. One exhaust gas cleaning method which is carried out particularly often in such exhaust gas treatment devices is the method of selective catalytic reduction [SCR], in which nitrogen oxide compounds are reduced by using a reducing agent, which is fed to the exhaust gas as a liquid additive (with or without a carrier gas, such as air). As a rule, an aqueous urea solution is used as the additive, which can be obtained under the trademark AdBlue®, for example.

As a rule, providing a liquid additive for an exhaust gas treatment device requires a delivery unit which delivers the additive from a tank to the exhaust gas treatment device. Such a delivery unit should have as simple a construction as possible, should be as inexpensive as possible and should be as reliable as possible. Another important requirement is suitability for rapid installation. Moreover, it should be possible to remove the delivery unit easily when required, thus ensuring that various components of the delivery unit are available for maintenance. At the same time, care should also be taken to ensure that the components are securely fixed in the motor vehicle during operation.

SUMMARY OF THE INVENTION

It is accordingly an object of the invention to provide a delivery unit for delivering a liquid additive and a motor vehicle having a delivery unit, which overcome the hereinafore-mentioned disadvantages and solve the highlighted technical problems of the heretofore-known units and vehicles of this general type in as advantageous a manner as possible. In particular, the intention is to specify a particularly easy-to-install delivery unit for delivering a liquid additive for the use mentioned above.

With the foregoing and other objects in view there is provided, in accordance with the invention, a delivery unit for delivering a liquid additive from a tank into an exhaust gas treatment device, comprising at least a housing, which can be mounted on the tank, and a component carrier, which carries at least one pump and is fixed in the housing by a clamping plate.

The housing is preferably suitable for mounting on or in an opening of the tank. In particular, an opening, into which the delivery unit or the housing can be inserted, can be provided in a tank wall of the tank. In this case, the housing is preferably disposed in the opening in such a way that it extends into an interior space of the tank, starting from an outer side. The housing or the delivery unit and the opening in the tank wall are preferably disposed at the bottom of the tank.

It is preferable if at least 50 percent and particularly preferable if at least 75 percent of the housing (or the interior space bounded by the housing) of the delivery unit is disposed within the tank. At least one intake point (or removal point), at which liquid additive can be removed from the tank and drawn into the delivery unit or into the housing, is preferably disposed on the housing. An intake point provided on the delivery unit is preferably likewise disposed in the vicinity of the tank bottom. This makes it possible to ensure that the delivery unit can deliver as much of the additive stored in the tank as possible from the tank. The intake point is preferably embodied with a filter, which prevents impurities from being drawn out of the tank into the delivery unit. The filter can be in the form of a sleeve which at least partially surrounds the housing within the tank. The filter can also be in the form of a screen.

In addition, the housing preferably has a connection element, to which an additive line for carrying the additive from the delivery unit to an injection point can be attached. The connection element is preferably situated in a section of the housing which faces an outer side of the tank when installed on the tank. The injection point preferably has a nozzle and/or an injector, through the use of which the liquid additive can be fed to the exhaust gas treatment device.

The component carrier is preferably manufactured from metal and, particularly preferably, from a metal that has a high thermal conductivity (e.g. aluminum). The component carrier can be a casting, for example. Various hydraulic components of the delivery unit can be mountable thereon, one of these hydraulic components being the pump through which the liquid additive is conveyed from the tank to the exhaust gas treatment device. Additional hydraulic components can be a pressure sensor and/or a valve for controlling the flow of the additive, for example.

The component carrier is preferably trapped and/or braced between the at least one clamping plate and a wall section of the housing. Matching apertures and/or guides can be provided on the housing and/or on the clamping plate in order to fix the component carrier in the housing or to define the position of the component carrier in the housing. By way of example, the guides can be internal fittings on the housing, which are matched to particular characteristic features of the shape of the component carrier and thus define a position of the component carrier in the housing. For example, the internal fittings can correspond to the negative shape of two opposite corners of the component carrier. The component carrier can then be inserted or permanently mounted in the housing in a manner which prevents relative rotation, being guided by the internal fittings or guides. It is also possible for the component carrier to be fixed indirectly by using the clamping plate, e.g. (exclusively) by fixing the component situated thereon (e.g. the pump).

One preferred option is to provide just one single clamping plate. Another preferred option is for the clamping plate to be of integral or one-piece construction.

The additive delivered by the delivery unit is preferably reducing agent (in particular aqueous urea solution), through the use of which the method of selective catalytic reduction can be carried out in the exhaust gas treatment device. For this purpose, an SCR catalytic converter is preferably provided in the exhaust gas treatment device.

In accordance with another particularly advantageous feature of the delivery unit of the invention, the component carrier is braced in the housing by using the clamping plate and, for this purpose, at least the clamping plate or the component carrier has at least one spring section.

The clamping plate preferably produces a preload which acts on the component carrier and presses the component carrier against the housing or against a wall section of the housing. The clamping plate is preferably manufactured from metal, e.g. from sheet metal. The spring section of the clamping plate and/or of the component carrier is preferably under an elastic preload in order to brace the component carrier in the housing. The preload defines the force which the clamping plate exerts on the component carrier (or vice versa). The force or preload is preferably chosen in such a way that the component carrier is disposed in a fixed position in the housing, even when there is vibration of the housing while the motor vehicle is being driven. The at least one spring section of the clamping plate is preferably embodied as a bent and/or plastically deformed area of the clamping plate which is deformed elastically during installation and thus produces the elastic preload (which is permanent in the installed state). The variant in which only the clamping plate is embodied with one or more (e.g. 2, 3, 4, 5 or 6) spring sections is preferred. If a plurality of spring sections is provided, they preferably interact with different areas of the housing and/or of the components and/or of the component carrier in the installed state.

In accordance with a further advantageous feature of the delivery unit of the invention, the clamping plate has a plurality of arms, which engage in recesses in a flange of the housing, wherein the arms are fixed in the recesses by using a cover, which closes the housing at the flange.

The housing is preferably embodied as a pot which is open at one end, and the opening of which is surrounded (all the way around) by the flange. The flange is preferably part of a connecting system (especially of an SAE connector or an SAE screw fastener) for securing the housing in an opening of the tank. In one variant embodiment, the housing can be closed by using the cover, with the clamping plate being braced by using the cover at the same time (i.e. at the same time as a closure). The housing can be secured in the opening in a separate operation. In another variant embodiment, the cover is used to brace the clamping plate in the housing and simultaneously to secure the housing on the tank. In both variant embodiments, the arms of the clamping plate are preferably clamped between the flange of the housing and the cover. The apertures described for the arms in the flange are advantageous to ensure that there is a flat sealing surface between the cover and the flange. At the same time, the arms define an installation direction for the clamping plate relative to the flange and hence also relative to the housing. In this case, the term "arm" is taken to mean, in particular, an elongate projection on the clamping plate which extends substantially radially, for example, from a central area of the clamping plate outwards. An arm preferably has an extent of at least 1 cm (centimeter) or even of at least 3 or 5 cm.

The clamping plate preferably has a central clamping area which presses against the component carrier and from which the arms extend radially outwards. The cover preferably exerts a force on the arms of the clamping plate which is transmitted by the arms to the clamping plate.

In order to form the spring sections, the arms are preferably deformed plastically. It is particularly advantageous if the arms each have two oppositely formed kinks, bends or the like, with the result, for example, that each arm has a spring section, which is slanted relative to the clamping plate, and a holding section, which is disposed parallel to the clamping plate or parallel to the central area of the clamping plate in a plane spaced apart therefrom. The spaced-apart plane preferably lies at a distance from the flange when the clamping plate is not braced. In order to brace the clamping plate or the spring sections, the holding sections in the spaced-apart plane are pushed closer to the clamping plate or, in particular, into the plane of the flange. During this process, the spring sections are deformed elastically.

In accordance with an added particularly advantageous feature of the delivery unit of the invention, at least one electronic component is disposed on the clamping plate.

The electronic component is preferably a control unit or a monitoring unit for at least partial open-loop control, closed-loop control and/or monitoring of delivery by the delivery unit. In the installed state, the electronic component is preferably situated opposite the component carrier on the clamping plate. The electronic component can be screwed to the clamping plate, for example. The electronic component is preferably mounted on the clamping plate before the installation of the clamping plate in the housing. The electronic component is preferably connected by a cable harness to the various components attached to the component carrier (in particular to the pump and/or to various sensors attached to the component carrier). The cable harness is preferably capable of being connected to the electronic component by using a plug connection. The electronic component preferably performs at least partial open-loop control of the components of the delivery unit. The active components of the delivery unit are preferably activated by the control unit of a motor vehicle only through the electronic component described. The control unit of the motor vehicle then merely transmits set points, such as particular pressures and/or delivery rates of the liquid additive to be made available, to the electronic component. The electronic component controls the active components of the delivery unit, in accordance with these set points if required. Necessary measures for achieving these set points (of the pressures and delivery rates for example) are then performed by the electronic component, preferably autonomously. For example, software can be installed on the electronic component to perform regular bleeding of the delivery unit through a return line if a pump in the delivery unit does not build up a pressure as desired.

In accordance with an additional advantageous feature of the delivery unit of the invention, the pump is secured on the component carrier in such a way that it can be pivoted about an axis of rotation of the pump, and the pump is in engagement with the clamping plate in such a way that rotation of the pump about the axis of rotation is limited or prevented.

The pump preferably has two line connections, the liquid additive being drawn in through one line connection and the liquid additive being discharged through the other line connection. The two line connections are preferably on a common axis, which is simultaneously the axis of rotation of the pump on the component carrier. Such a pump is preferably a reciprocating piston delivery pump, which has a reciprocating piston that can preferably be moved substantially parallel to the common axis of the line connections which has been described and that can particularly preferably even be moved on that axis. Such a pump is distinguished by a particularly simple construction and is therefore particularly inexpensive.

The pump is preferably secured on the component carrier (only) with O-ring seals at the two connections, thereby making it possible to achieve thermal and vibrational decoupling of the pump and the component carrier. However, the O-ring seals then also permit a movement of the pump relative to the component carrier. Two O-ring seals are preferably provided at each line connection, with both of the seals being disposed concentrically with the common axis of the line connections. A smaller, inner O-ring seal is used for fluid-tight sealing of the line connection. A larger, outer O-ring is used to provide damped support for the pump. Forces which act between the component carrier and the pump due to vibration or acceleration are preferably transmitted by the larger, outer O-ring. A connection section of the component carrier preferably extends into the line connection of the pump. The smaller, inner O-ring seal is then situated between the connection section and the line connection. On the outside, the line section of the pump is surrounded by a holding section of the component carrier. The larger, outer O-ring is situated between the line section of the pump and the holding section of the component carrier.

In order to limit or prevent rotation of the pump about the axis of rotation in the O-ring seals, the pump preferably has a projection. The projection on the pump is in engagement with an aperture provided on the clamping plate, thus preventing rotation. The projection extends through a plane formed by the clamping plate. The aperture projects relative to the component carrier. A damping element can preferably also be provided in the area of the aperture in the clamping plate, surrounding the projection on the pump and thus damping movements of the pump and of the projection relative to the clamping plate. For example, the aperture can have a rubber insert which surrounds the projection. The aperture is preferably situated in a central area of the clamping plate, which area presses against the component carrier.

In accordance with yet another advantageous feature of the delivery unit of the invention, the component carrier includes a U-shaped pump holder, and the pump is disposed between two limbs of the pump holder. A (first) connection of the pump is preferably disposed on one limb and the other (second) connection of the pump is preferably disposed on the second limb of the pump holder. The pump is thus surrounded or enclosed by the component carrier or pump holder, in particular.

In accordance with yet a further advantageous feature of the delivery unit of the invention, the component carrier has at least one channel, through which the pump delivers the additive, and the channel connects the pump to at least one further functional component of the delivery unit.

The at least one further functional component can be a temperature sensor for measuring a temperature of the component carrier or of the additive, for example. The at least one functional component can also be a pressure sensor for measuring a pressure of the additive. It is also possible for the at least one functional component to be a valve which controls the flow of the additive in the channel. It is possible, for example, to provide a return valve, which can open or close a return line extending back from the delivery unit (or the channel) into the tank. At least one pressure sensor, one temperature sensor and one return valve are preferably provided as further functional components. The channel is embodied as a bore hole in the component carrier, for example. If the component carrier is manufactured as a casting, it is also possible for the channel to be cast. The channel preferably forms one section of a flow path of the additive from the tank to the exhaust gas treatment device. The channel preferably extends in the manner of a main channel, starting from the pump, through the component carrier, to the outlet connection. The temperature sensor can adjoin the channel, for example, in order to measure the temperature of the additive in the channel. The pressure sensor can be disposed on a side channel which branches off from the main channel of the channel. It is also possible for another side channel, which leads to an additional opening in the housing and thus opens into the tank, to branch off from the main channel. This side channel then forms a return line. A return valve, through the use of which the side channel can be opened and closed, can be disposed in the side channel. Through the use of such a return line, it is possible to carry out recirculation of reducing agent through the pump and back into the tank. This enables the pump to be bled.

In accordance with yet an added advantageous feature of the delivery unit of the invention, there is at least one liquid-carrying connection for delivering the additive through the housing to the component carrier, this connection being established by using a line component which extends from an outer side, through the housing, to the component carrier and which is sealed off at the housing and at the component carrier in each case by using at least one O-ring seal.

The liquid-carrying connection preferably connects an outer side of the housing to a channel in the component carrier. The line component is preferably inserted through the housing from an outer side of the housing. During the installation of the delivery unit, the component carrier is preferably first of all clamped in the housing by using the clamping plate. The line component is then inserted into the component carrier from outside through the housing, with sealing of the line component at the component carrier and the housing being accomplished by using the O-ring seals. The line component is fixed from the outside by using a fixing device (e.g. a screw or a fastener) in order to hold it in position on the housing and in the clamping plate.

The outer side of the housing, starting from which the line component extends to the component carrier, is preferably situated in the interior space of the tank, in which the additive is stored. The line component preferably forms an intake point for drawing in additive from the interior space of the tank.

With the objects of the invention in view, there is concomitantly provided a motor vehicle, comprising an internal combustion engine, an exhaust gas treatment device for cleaning exhaust gases from the internal combustion engine, a tank for an additive and a delivery unit according to the invention for delivering the additive from the tank into the exhaust gas treatment device. Thus, the installed delivery unit is disclosed especially for a motor vehicle as a preferred area of application.

Other features which are considered as characteristic for the invention are set forth in the appended claims, noting that the features presented individually in the claims can be combined in any technologically meaningful way and can be supplemented by explanatory material from the description, giving rise to additional variant embodiments of the invention.

Although the invention is illustrated and described herein as embodied in a delivery unit for delivering a liquid additive and a motor vehicle having a delivery unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
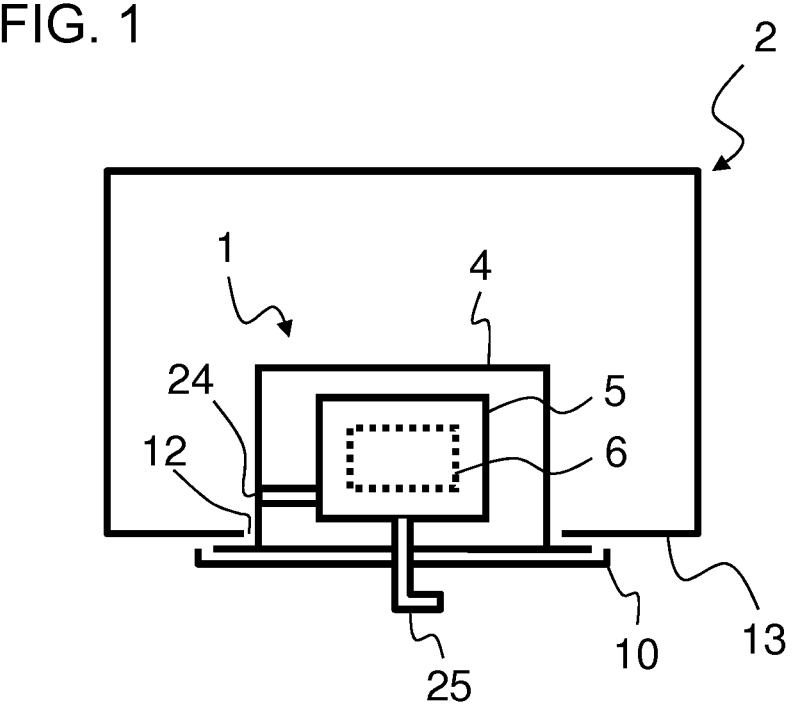
FIG. 1 is a diagrammatic, vertical-sectional view of a tank with a delivery unit.

Referring now in detail to the figures of the drawing which show particularly preferred embodiments to which the invention is not restricted and in which size ratios are diagrammatic, and first, particularly, to FIG. 1 thereof, there is seen a tank 2, in which a delivery unit 1 is disposed. The delivery unit is disposed at a tank bottom 13 of the tank 2, in an opening 12 in the tank 2. The delivery unit 1 extends into an interior space of the tank 2, starting from the tank bottom 13. The delivery unit 1 includes a housing 4, in which there is a component carrier 5. A pump 6, indicated therein in dashed lines, is secured on the component carrier 5. The delivery unit 1 takes the liquid additive from the tank 2 at an intake point 24 and delivers it to an outlet connection 25. An additive line, through which the additive can be carried from the delivery unit 1 to a non-illustrated injector or injection point, can be attached to the outlet connection 25. The additive can be fed to an exhaust gas treatment device at this injection point or injector. The housing 4 can be closed by a cover 10. In addition to its closing function, the cover 10 can be set up to secure the housing 4 and/or the delivery unit 1 in the opening 12 in the tank bottom 13.

Figure 2:
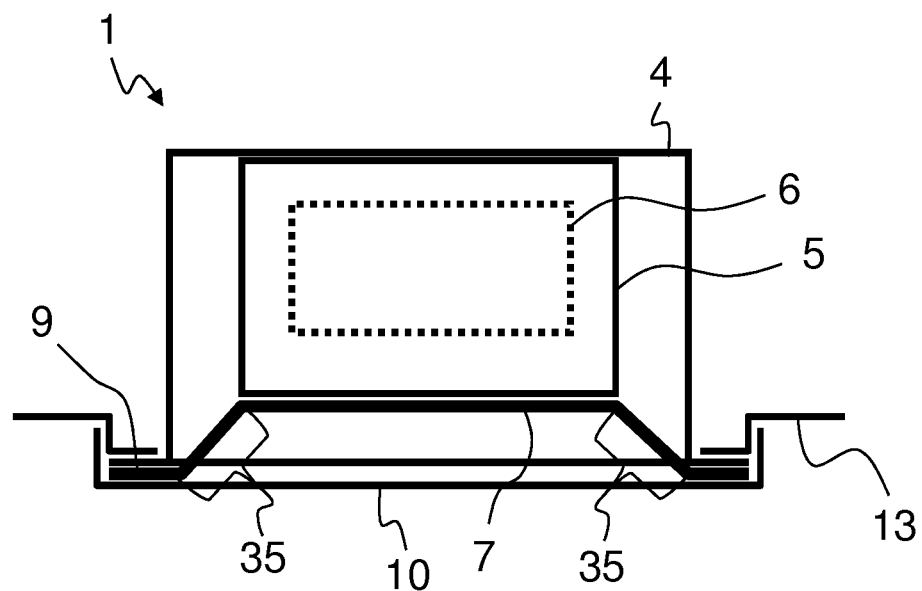
FIG. 2 is a vertical-sectional view of a variant embodiment of a delivery unit.

FIG. 2 shows a delivery unit 1 in more detail. This figure also shows the housing 4, the component carrier 5 with the pump 6, the tank bottom 13 and the cover 10. A clamping plate 7, through the use of which the component carrier 5 is fixed (and, in particular, is indeed braced) in the housing 4, is illustrated in addition. The clamping plate 7 engages in a flange 9. The flange 9 is part of the housing 4 and establishes a connection between the housing 4 and the tank bottom 13. The clamping plate 7 preferably has at least one section which engages in the flange 9. In this case, this section is shown on both sides directly on the flange 9. There is furthermore preferably at least one section of the clamping plate 7 which presses against the component carrier 5 or is in contact with the component carrier 5. Disposed between these different sections of the clamping plate 7 are preferably spring sections 35, which are under elastic stress and thus exert a force on the clamping plate 7 and on the component carrier 5 and brace the component carrier 5 in the housing 4.

Figure 3:
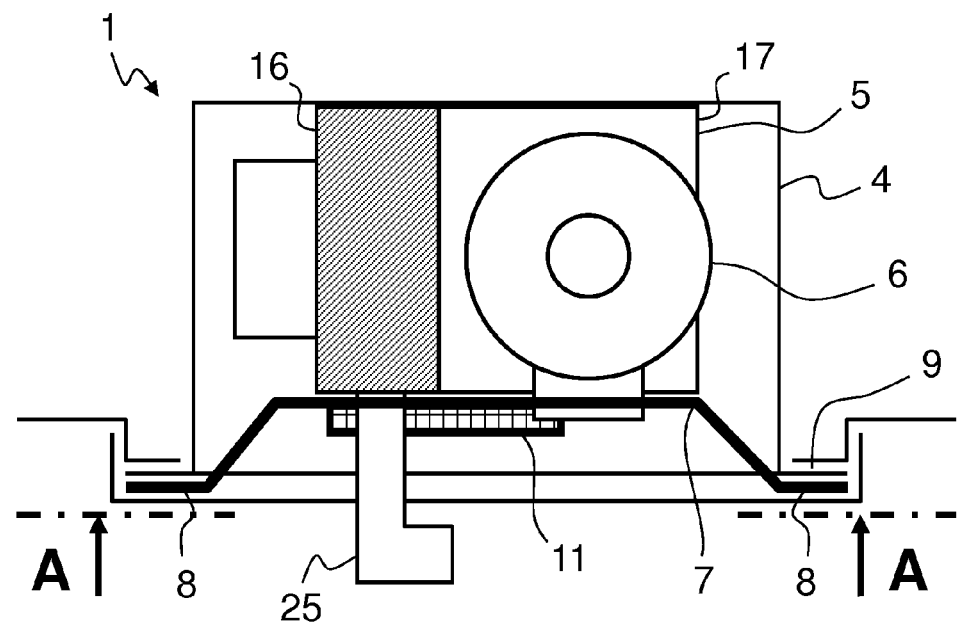
FIG. 3 is another vertical-sectional view of a delivery unit.

FIG. 3 shows another, more detailed illustration of a delivery unit 1 in section, with further components present in the delivery unit 1 being visible therein. In this case too, the housing 4 with the component carrier 5 and the clamping plate 7 are visible. The component carrier 5 carries the pump 6. The component carrier 5 includes or forms a pump holder 16, which is U-shaped. The pump holder 16 has two limbs 17, with one limb 17 being visible in FIG. 3. The two limbs 17 are connected to one another by a central area, which is shown as a hatched area in section in FIG. 3. The pump 6 is disposed between the two limbs 17, although one of the limbs 17 is not visible, due to the sectional view chosen therein. Starting from the component carrier 5, an outlet connection 25 extends out of the delivery unit 1 and out of the housing 4. An additive line, for example, can be connected to the outlet connection 25. The clamping plate 7 has a plurality of arms 8, each of which extends from a central area of the clamping plate 7, where it starts, and engages in a flange 9. An electronic component 11, which can be a control unit or a monitoring unit for the delivery unit 1, for example, is disposed on the clamping plate 7. The electronic component 11 is situated opposite the component carrier 5, on the other side of the clamping plate 7.

Figure 4:
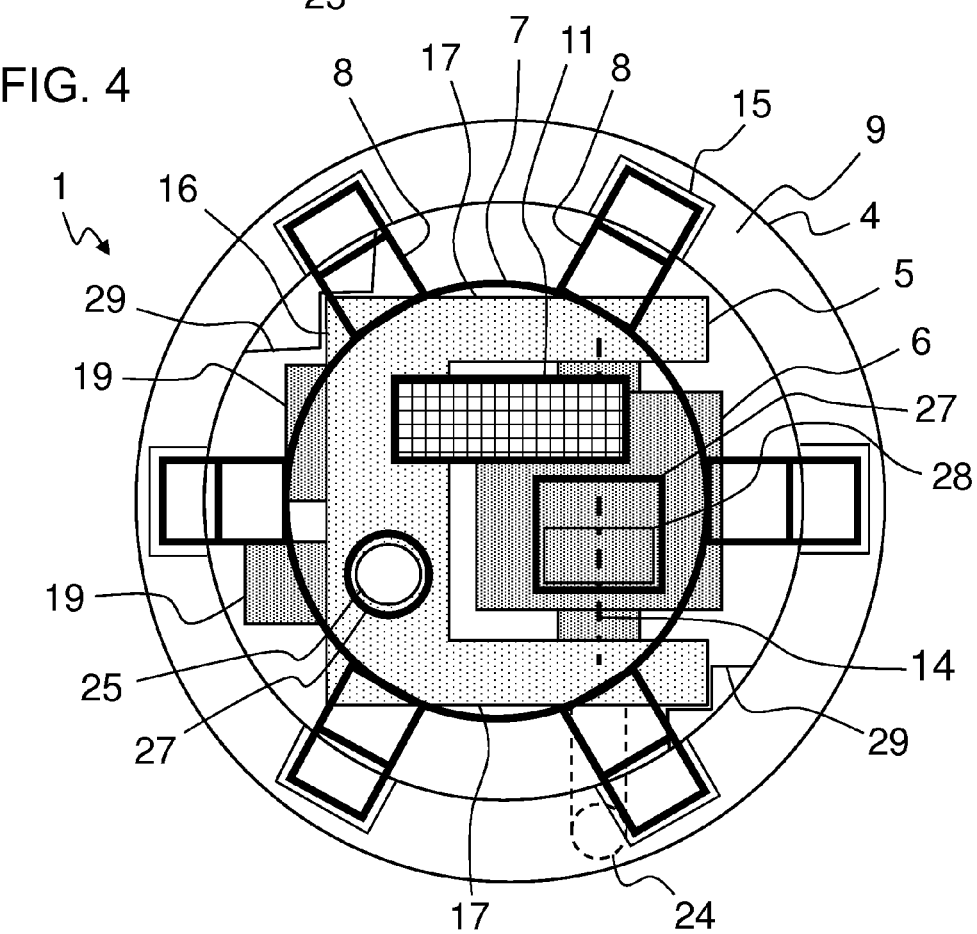
FIG. 4 is a bottom-plan view of the delivery unit of FIG. 3.

FIG. 4 shows a view of the delivery unit 1 of FIG. 3 indicated by an arrow A in FIG. 3. No cover is disposed on the housing 4 in this case. The view into the housing 4 is from below. In this case, the clamping plate 7 is shown as partially transparent in order to show the component carrier 5, which is disposed under the clamping plate 7. In this case, it can be seen that the clamping plate 7 carries the electronic component 11. The clamping plate 7 has a central area which presses against the component carrier 5. Arms 8 extend from the central area, where they start. The housing 4 has a flange 9. Provided on the flange 9 are recesses 15, in which the arms 8 of the clamping plate 7 are disposed. The arms 8 are in engagement in the recesses 15 on the clamping plate 7.

It can also be seen that the component carrier 5 includes a U-shaped pump holder 16, which has two limbs 17, between which the pump 6 is disposed. Starting from the component carrier 5, an intake point 24 extends through the housing 4, which is shown in dashed lines therein. Also starting from the component carrier 5 is an outlet connection 25, to which an additive line can be connected. In addition to the pump 6, further functional components 19 of the delivery unit 1 are also secured on the component carrier 5. Guide ribs 29 are provided in the housing 4, defining a position of the component carrier 5 in the housing. Two apertures 27 are provided in the clamping plate 7. A (first) aperture 27 enables the outlet connection 25 to extend away from the component carrier 5, at which it starts. Disposed in the other (second) aperture 27 is a projection 28 on the pump 6. The pump 6 is secured on the limbs 17 of the component carrier in such a way that it could be rotated about an axis of rotation 14 in the absence of the clamping plate 7. The projection 28 on the pump 6 is in engagement in the aperture 27 of the clamping plate 7. This engagement prevents or limits an (undesirably large) rotation of the pump 6 about the axis of rotation 14.

Figure 5:
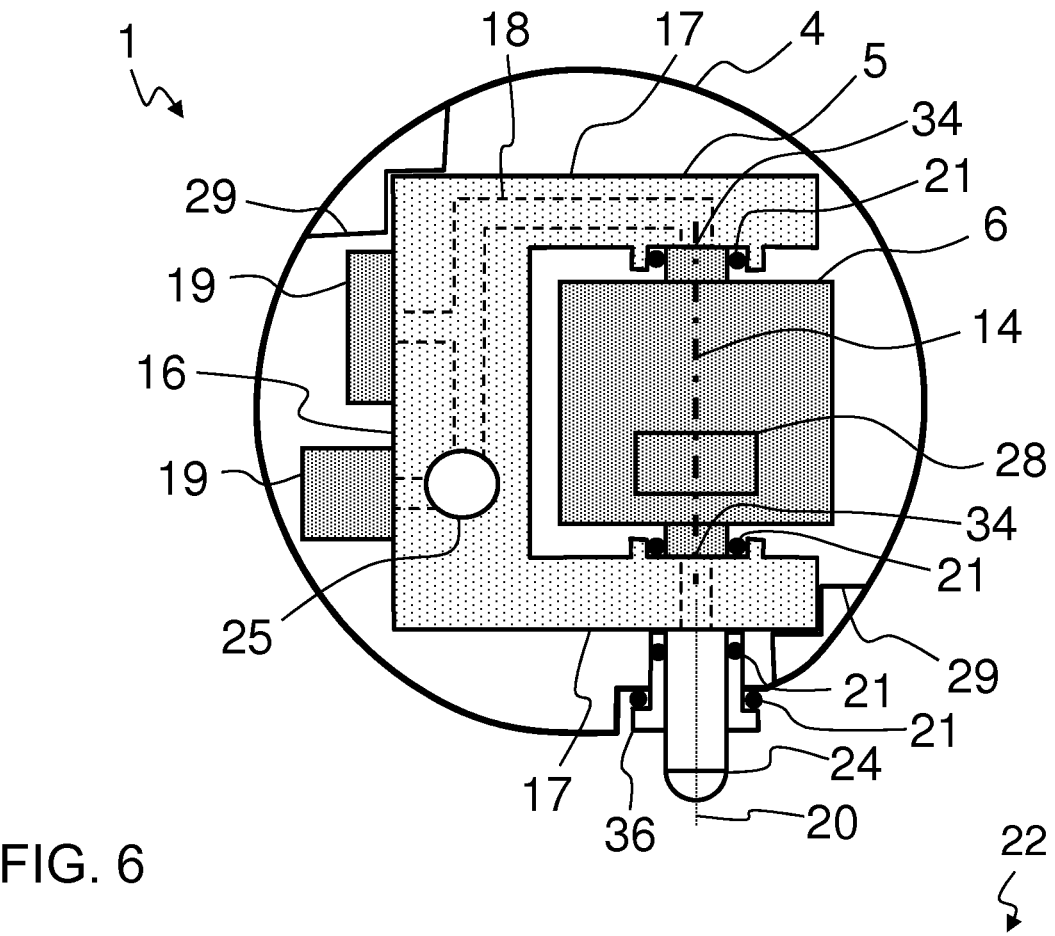
FIG. 5 is a bottom-plan view of the delivery unit of FIG. 3, without a clamping plate.

In order to provide a more detailed illustration of the components on the component carrier 5, the delivery unit 1 is shown without the clamping plate in FIG. 5. In this case too, the component carrier 5 can be seen in the housing 4. The component carrier 5 includes a pump holder 16 having two limbs 17 and a central area. The pump 6 is secured on the component carrier 5 between the two limbs 17. The pump 6 has two pump connections 34. A fluid connection for the purpose of drawing additive into the pump 6 can be established by using one pump connection 34. A fluid connection for the purpose of expelling additive from the pump 6 can be established by using the other pump connection 34. The pump connections 34 are preferably both disposed on a common axis. The pump connections 34 are preferably sealed off at the limbs 17 by O-ring seals 21. The pump 6 can be rotated about the pump connections 34, with the axis of the pump connections 34 thus forming an axis of rotation 14. The projection 28, which is also visible on the pump 6, can be in engagement with the clamping plate 7 in order to prevent rotation of the pump 6 about the axis of rotation 14.

A channel 18, which passes through the component carrier 5, is illustrated in dashed lines in FIG. 5. The channel 18 establishes a fluid connection from the intake point 24 to the pump connection 34 into the pump 6. The channel 18 furthermore establishes a connection from the pump connection 34 to the outlet connection 25. Further functional components 19, which are disposed on the component carrier 5, can furthermore also be connected to the channel 18. These further functional components 19 can be pressure sensors, temperature sensors or liquid valves, for example.

The component carrier 5 can be (additionally) fixed in its position by using guide ribs 29 on the housing 4. In this case, the guide ribs 29 are internal fittings on the housing 4, which are matched to particular characteristic features of the shape of the component carrier 5 and thus define a position of the component carrier 5 in the housing 4.

The intake point 24 is also shown in more detail in FIG. 5. The intake point 24 is formed by a line component 36 which extends from an outer side, through the housing 4, to the component carrier 5. The line component 36 thus forms a liquid-carrying connection 20 from the outer side, through the housing 4, into the component carrier 5 or into the channel 18 disposed in the component carrier 5. The line component 36 is sealed off at the housing 4 and at the component carrier 5 in each case by using at least one O-ring seal 21. The line component 36 is preferably attached to the housing 4 from the outside when the component carrier 5 is already in the housing 4 and is fixed in its final position by using the clamping plate 7.

Figure 6:
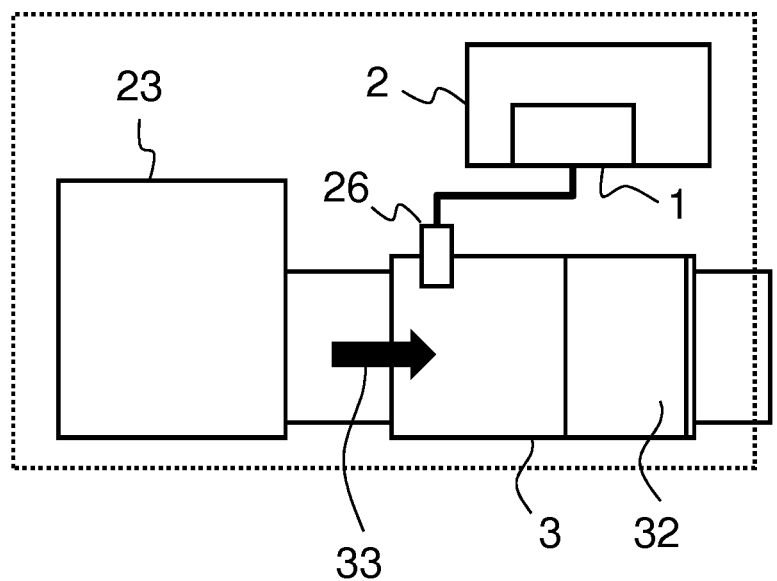
FIG. 6 is a block diagram of a motor vehicle having a delivery unit.

FIG. 6 shows a motor vehicle 22 having a combustion engine 23 and an exhaust gas treatment device 3 for cleaning exhaust gases from the combustion engine 23. A liquid additive, which can be taken from a tank 2 by a delivery unit 1, can be fed into the exhaust gas treatment device 3 by way of an injection device 26. The delivery unit 1 is disposed at the bottom of the tank 2. The delivery unit 1 directs the liquid additive to the injection device 26 through a line. The illustration therein also shows that the injection device 26 is disposed in the exhaust gas treatment device 3 in such a way that the additive is taken along by the exhaust gas flowing past in a direction of flow 33 and is distributed therein. This exhaust gas/additive mixture can then be fed to an SCR catalytic converter 32, where the desired reactions for conversion of the exhaust gas can take place.

Figure 7:
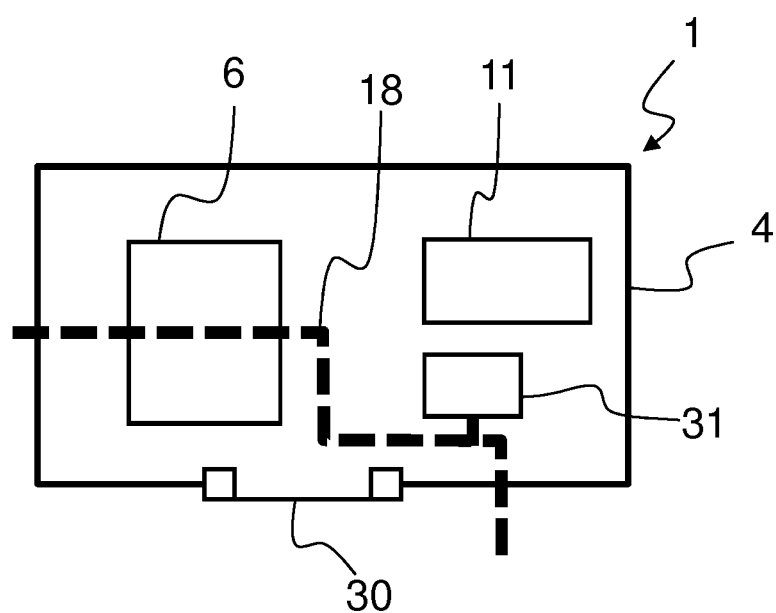
FIG. 7 is a block diagram of another variant embodiment of a delivery unit.

In another variant embodiment of the delivery unit 1 in accordance with FIG. 7, a pump 6 and an electronic component 11 are situated in a housing 4 of the delivery unit 1. Through the use of the pump 6, liquid additive can be delivered from a tank 2 to an injection device for making available the liquid additive for an exhaust gas treatment device. In the housing 4 of the delivery unit 1 shown in FIG. 7, there is an opening, which is closed by a semi-permeable membrane 30. This membrane is permeable to air and impermeable to liquids. A pressure equalization can thus take place between an interior space of the housing 4 and an outer side. At the same time, liquid is prevented from entering the housing 4 from the outer side. Through the use of such a membrane 30, it is possible to ensure that a pressure sensor 31 disposed in the housing 4 is exposed to the ambient pressure prevailing outside the housing and can thus measure a pressure in a channel 18 for delivering the additive in the delivery unit 1 relative to ambient pressure. At the same time, moisture is prevented from entering the housing 4 and thus damaging electronic components 11 in the housing 4, for example.

The variant of a delivery unit shown in FIG. 7 can also be used independently of the other features, given herein in accordance with the invention in relation to the clamping plate, to enable continuous functioning of the delivery unit to be checked or achieved, for example. This construction can furthermore also be combined in any desired manner with all of the other features in the above description. Thus, in particular, the following subject matter is also disclosed herein as a development of the known prior art: a delivery unit for an additive, having a housing, in which a pump for delivering the additive, and at least one electronic component are disposed, wherein the housing has a wall section formed by a semi-permeable membrane. The housing preferably contains a pressure sensor, through which a pressure in a channel in the delivery unit can be measured, with the channel serving to deliver the additive. In so far as the same terms/features are presented herein, reference can be made in full to the corresponding complementary explanations above. This applies especially to the explanations relating to the housing, the pump, the connections of the housing, the channels, the area of application of the delivery unit, etc.

The invention claimed is:

1. A delivery unit for delivering a liquid additive from a tank into an exhaust gas treatment device, the delivery unit comprising:
   a housing configured to be mounted on the tank;
   a component carrier;
   a clamping plate fixing and bracing said component carrier in said housing;
   at least one of said clamping plate or said component carrier having at least one spring section; and
   at least one pump carried by said component carrier.

2. A delivery unit for delivering a liquid additive from a tank into an exhaust gas treatment device, the delivery unit comprising:
   a housing configured to be mounted on the tank, said housing having a flange with recesses formed therein;
   a component carrier;
   a clamping plate fixing said component carrier in said housing, said clamping plate having a plurality of arms engaging in said recesses;
   a cover fixing said arms in said recesses and closing said housing at said flange; and
   at least one pump carried by said component carrier.

3. The delivery unit according to claim 1, which further comprises at least one electronic component disposed on said clamping plate.

4. A delivery unit for delivering a liquid additive from a tank into an exhaust gas treatment device, the delivery unit comprising:
   a housing configured to be mounted on the tank;
   a component carrier;
   a clamping plate fixing said component carrier in said housing; and
   at least one pump carried by said component carrier and having an axis of rotation, said pump being configured to be secured on said component carrier for permitting said pump to be pivoted about said axis of rotation, and said pump being in engagement with said clamping plate for limiting or preventing rotation of said pump about said axis of rotation.

5. The delivery unit according to claim 1, wherein said component carrier includes a U-shaped pump holder having two limbs, and said pump is disposed between said two limbs.

6. The delivery unit according to claim 1, which further comprises:
a functional component being said pump,
at least one further functional component,
said component carrier having at least one channel through which said pump delivers the additive, and
said channel connecting said pump to said at least one further functional component.

7. The delivery unit according to claim 1, which further comprises:
at least one liquid-carrying connection configured to deliver the additive through said housing to said component carrier;
a line component forming said at least one liquid-carrying connection and extending from an outer side through said housing to said component carrier; and
O-ring seals, at least one of said O-ring seals each sealing off said line component at a respective one of said housing and said component carrier.

8. A motor vehicle, comprising:
an internal combustion engine;
an exhaust gas treatment device configured to clean exhaust gases from said internal combustion engine;
a tank for an additive; and
the delivery unit according to claim 1 configured to deliver an additive from said tank into said exhaust gas treatment device.

9. A motor vehicle, comprising:
an internal combustion engine;
an exhaust gas treatment device configured to clean exhaust gases from said internal combustion engine;
a tank for an additive; and
the delivery unit according to claim 2 configured to deliver an additive from said tank into said exhaust gas treatment device.

10. A motor vehicle, comprising:
an internal combustion engine;
an exhaust gas treatment device configured to clean exhaust gases from said internal combustion engine;
a tank for an additive; and
the delivery unit according to claim 4 configured to deliver an additive from said tank into said exhaust gas treatment device.

* * * * *